United States Patent [19]
Stiles

[11] Patent Number: 5,456,035
[45] Date of Patent: Oct. 10, 1995

[54] RETICLE GUNSIGHT

[75] Inventor: Hallett R. Stiles, Tampa, Fla.

[73] Assignee: The United States of America as represented by the Secretary of the Army, Washington, D.C.

[21] Appl. No.: 239,818

[22] Filed: May 9, 1994

[51] Int. Cl.[6] .................................................. F41G 1/32
[52] U.S. Cl. .............................. 42/100; 362/110; 33/241
[58] Field of Search ........................... 42/103, 101, 100; 33/241, 246; 362/110

[56] References Cited

U.S. PATENT DOCUMENTS

| | | | |
|---|---|---|---|
| 2,641,156 | 6/1953 | Canada | 33/241 |
| 3,645,635 | 2/1972 | Steck | 42/103 |
| 3,813,790 | 6/1974 | Kaltmann | 356/252 |
| 3,880,529 | 4/1975 | Althause et al. | 350/10 |
| 3,992,782 | 11/1976 | Rickert | 42/101 |
| 4,136,963 | 1/1979 | Budden et al. | 33/241 |
| 4,877,324 | 10/1989 | Hauri et al. | 33/241 |
| 5,025,564 | 6/1991 | Sanders | 33/297 |
| 5,044,748 | 9/1991 | Scott et al. | 356/251 |
| 5,090,805 | 2/1992 | Stawarz | 33/241 |

FOREIGN PATENT DOCUMENTS 1451694  9/1966  France .................................. 42/100

Primary Examiner—Stephen M. Johnson
Attorney, Agent, or Firm—Freda L. Krosnick; Charles H. Harris

[57] ABSTRACT

A reticle gunsight is illuminated by a chemical illumination stick which is inserted through a tapped port in a lower chamber of the gunsight. The tapped port is closed with a threaded plug to retain light within the lower chamber. The lower chamber has an optical opening therein which is aligned with reticle cross hairs to produce a light beam having the image of the cross hairs. The light beam is focussed through a collimated lens and then directed by a prism onto a beam splitter in an upper chamber of the reticle gunsight. The upper chamber is open at both ends and is aligned with the barrel of the gun so that when the image of the target is superimposed with the image of the reticle in the beam splitter, the person using the gun knows that the gun is aimed at the target. Since the gunsight does not rely on electrical illumination and does not itself illuminate the target, many deficiencies associated with previous gunsight configurations are eliminated.

12 Claims, 4 Drawing Sheets

5,456,035

RETICLE GUNSIGHT

FIELD OF THE INVENTION

The instant invention relates to reticle gunsights, and, more particularly, the instant invention relates to reticle gunsights which utilize an illumination source.

BACKGROUND OF THE INVENTION

Due to need for an electrical light source, illuminated gunsights in current use for weapons such as military rifles and the like have a number of drawbacks. Since military arms are frequently used under rugged, adverse conditions in which the arms become wet and are subject to wide temperature variations as well as mechanical shocks and vibrations, electrically illuminated gunsights are more likely to incur damage than nonelectrical gunsights. Electrically illuminated gunsights frequently utilize integrated circuitry that can be damaged by nuclear generated electromagnetic pulses in addition to being rendered inoperative when soaked with water. Even during daylight, electrically illuminated gunsights may require electrical energy for their operation, so that if the electrical components of the gunsights fail to function, the gunsight's effectiveness can be compromised during daylight hours.

Gunsights which emit signals detectable to observers other than the operator of the weapon, such as the AN/PAQ-4 infrared aiming light, broadcast the operator's position to everyone that is wearing night vision goggles. Operating weapons equipped with such sights is therefore not necessarily in the best interests of the shooter.

Since military personnel may be required to wear head gear such as gas masks and, when operating at night, utilize night vision goggles, the distance that the eye of the operator must be placed with respect to the gunsight can be compromised with current gunsight configurations. Therefore, there is a need for a gunsight which accommodates such equipment.

SUMMARY OF THE INVENTION

In view of the aforementioned drawbacks of currently used gunsights, it is an object of the instant invention to provide a new and improved reticle gunsight which does not rely in any way on electrical current, which emits no signal detectable to an observer, which is readily usable with night vision goggles, gas masks and other head gear and which is of a rugged design suitable for military duty under adverse weather and combat conditions.

In view of the above-discussed objects and other objects, the instant invention contemplates a sighting device for superimposing the image of a reticle on the image of a target. The sighting device includes a first chamber having an opening therethrough for introducing a source of light to the first chamber and a second chamber in communication with the first chamber through a wall having an optical opening therethrough aligned with the reticle. The second chamber has a collimating lens therein aligned with the optical opening for directing an image of the reticle into a prism which reflects the image of the reticle out of a second opening in the second chamber. A third chamber, having front and rear optically open ends, is optically aligned with a beam splitter which is optically aligned with the image of the reticle reflected by the prism. Consequently, when an image of the target is presented to the front end of the third chamber, the target image is superimposed upon the reticle image and is viewable as such from the rear end of the third chamber when the sighting device is in alignment with the target.

In a specific use, the sighting device contemplates a reticle gunsight useful for aiming a gun at a target wherein the gunsight comprises a beam splitter having a first surface facing toward the target when the gun is aimed at the target and a second surface for receiving an image of the reticle to superimpose the image of the target on the image of the reticle. The reticle image is created by an optical opening aligned with a reticle which is illuminated by either ambient illumination as a light source or by a chemical illumination device as a light source.

The invention further contemplates a chemically illuminated reticle sight in combination with a gun.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
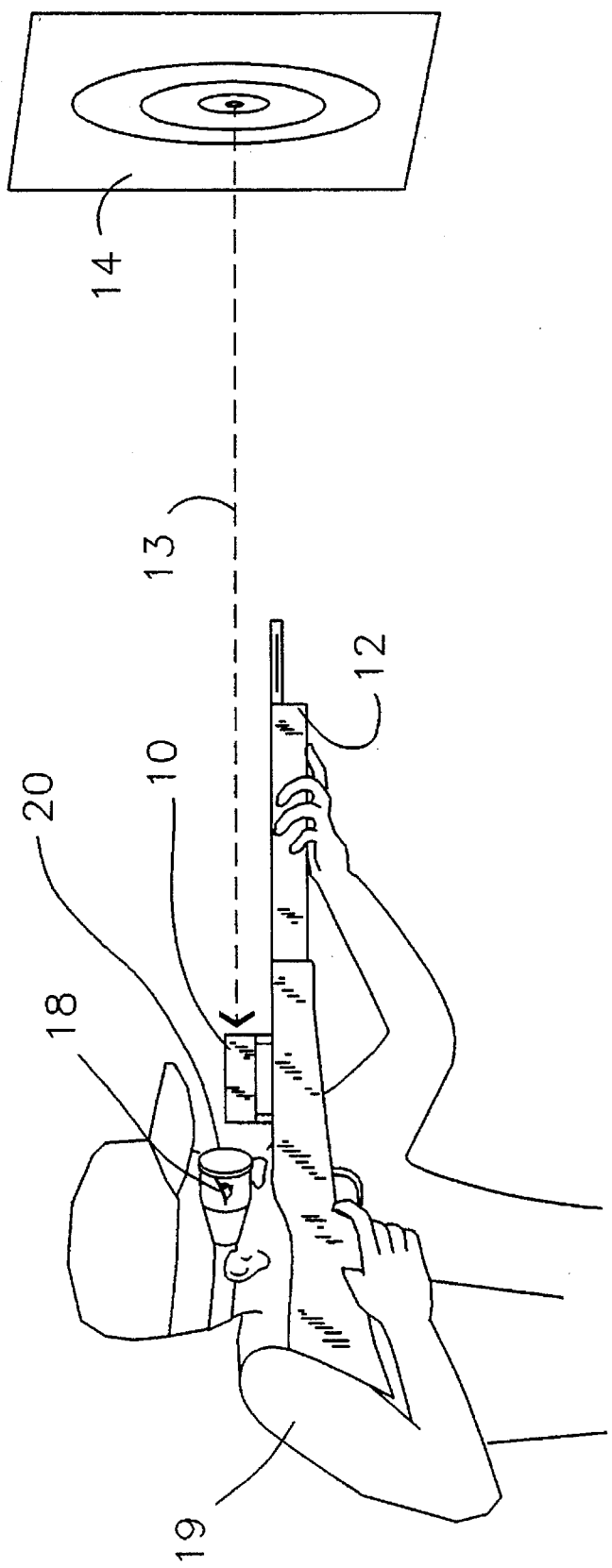
FIG. 1 is a schematic view of the gunsight of the instant invention mounted on a gun and cited on a target.
Figure 4:
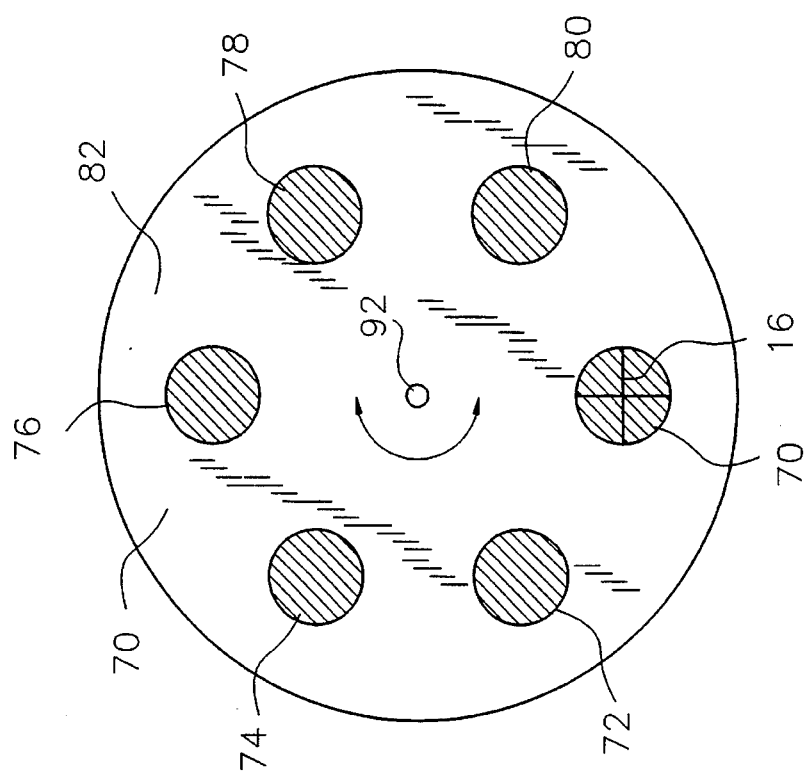
FIG. 4 is a planar view of a filter disk utilized in the reticle gunsight of the instant invention.

Referring now to FIG. 1, there is shown a reticle gunsight configured in accordance with the instant invention and designated generally by the numeral 10. The reticle gunsight 10 is mounted on a small arm such as a military rifle 12 for sighting the rifle on a target 14. The image 13 of the target 14 is aligned with cross hairs, or the like, 16 (see FIG. 4) disposed within the reticle gunsight 10 and visible to the eye 18 of the shooter 19. The user 19 of the gun 12 may be a combatant such as an infantryman who is wearing head gear such as a gas mask or night vision goggles which have a lens 20 disposed between the eye 18 of the infantrymen and the reticle gunsight 10.

Figure 2:
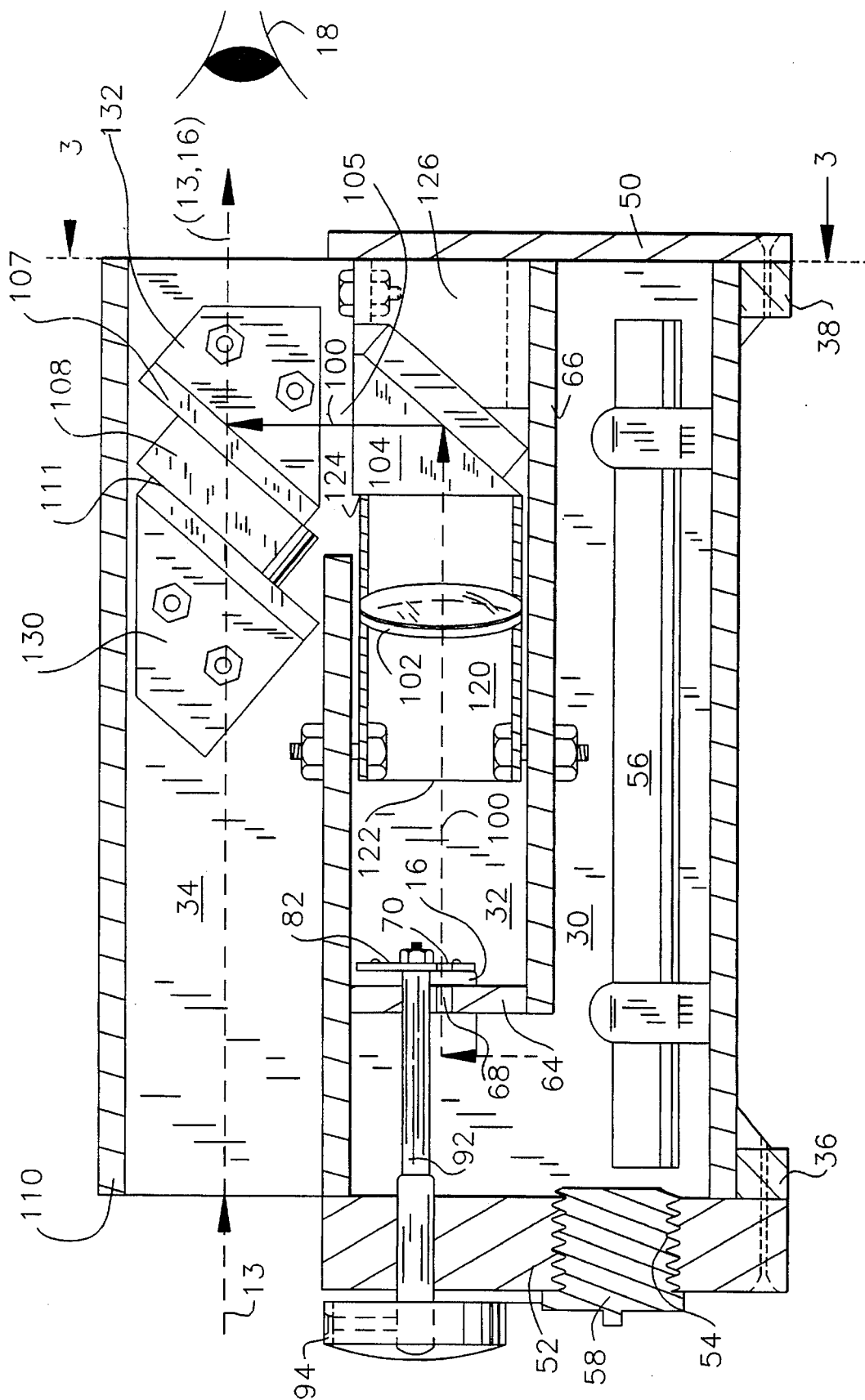
FIG. 2 is a side view of the gunsight with a side wall removed to expose the components of the gunsight.
Figure 3:
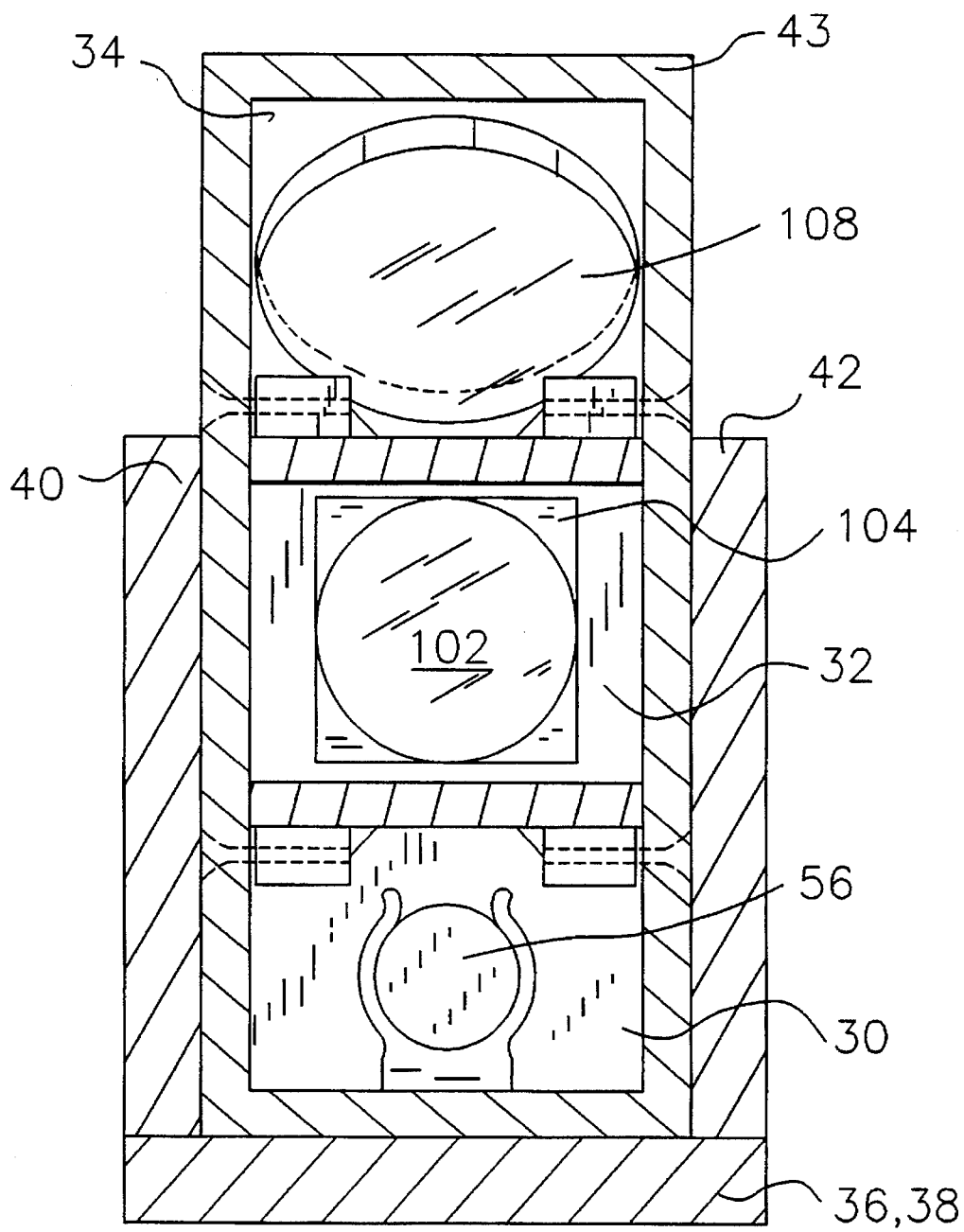
FIG. 3 is an end view of the gunsight with FIG. 2 taken along lines 3—3 of FIG. 2.

As is seen in FIGS. 2 and 3, the reticle gunsight is generally rectangular in cross-section and is divided into a first chamber, lower chamber 30; a second chamber, middle chamber 32, and a third chamber, upper chamber 34. The first, second and third chambers, 30, 32 and 34, are vertically stacked on one another and axially extend in the same direction as the barrel of the rifle 12 (FIG. 1). The reticle gunsight 10 is secured to the upper surface of the barrel of rifle 12 by a pair of bars 36 and 38 and pairs of vertically extending struts 40 and 42. The bars and struts 36, 38 and 40, 42, respectively, are rigidly attached to the reticle gunsight 10 in order to stabilize the gunsight with respect to the gunbarrel 12. The bars and struts 36–42 are ¼ square inch aluminum bars and the housing containing the components of the gunsight 10 is made of aluminum so that the structural elements of the gunsight are not subject to thermal stresses due to different coefficients of expansion.

The first or lower chamber 30 is covered at the rear end 44 thereof by an end plate 50 and at the front end 46 thereof by a relatively thick front plate 52. The front plate 52 has a tapped port 54 therethrough to provide access to the first or lower chamber 30. A conventional, self-contained, chemical light stick 56 is placed in the first chamber 30 by passing the light stick through the tapped port 54. The tapped port 54 is closed by a threaded plug 58. In order to reflect light emanating from the light stick 56, the interior surfaces of the walls defining the chamber 30 are painted a gloss white. The light stick 56 is of a type carried by military personnel and sportsman, and is also used in amusement devices.

In order for light from the chemical light stick 56 within the first chamber 30 to be usable by the reticle gunsight 10, a vertical wall 64 provides one wall defining the first chamber while a plate 66 defines an upper wall of the first chamber and the lower wall of the second or middle chamber 32. The vertical wall 64 has a reticle hole or optical opening 68 therethrough which includes aligned therewith a reticle in the form of the cross hairs 16 (see FIG. 4). Aligned with the reticle hole or optical opening 68 is a light filter 70 which is selected by the shooter from a plurality of light filters 72–80 (see FIG. 4) which are mounted on a dimming disk 82. The dimming disk 82 is secured to a spindle 92 journaled in the wall 64 and in the front end wall 52. The spindle 92 has at its outer end a knob 94 which is rotated to select one of the filters 70–80 for alignment with the reticle hole 68.

The reticle hole 68 creates a light beam 100 having the image of the cross hairs 16 (FIG. 4) which is aligned with a collimating lens 102. The collimating lens 102 focuses the beam 100 on a prism 104 which directs the beam out of an opening 105 in the middle or second chamber 32 to a first surface 107 of a beam splitter 108 retained within the upper or third chamber 34. The beam splitter 108 provides an image of the reticle cross hairs 16 aligned with the reticle opening 68 which is viewable by the eye 18 of the shooter 19 aligned with the sight 10 through the third or upper chamber 34. The front end 110 of the third or upper chamber 34 is open so that the image 13 of the target 14 passes through the front surface 111 of beam splitter 108 and is visible to the eye 18 of the shooter 19 with the cross hairs 16 of the reticle superimposed thereupon.

Collimating lens 102, prism 104 and beam splitter 108 are each rigidly held within the second and third chambers 32 and 34 by structures fixed to the walls of the reticle gunsight 10. The collimating lens 102 is fixed within a cylindrical barrel 120 which is open at its front end 122 and abuts one face of the prism 104 at its second end 124. The prism 104 is urged into abutment with the second end of the cylindrical tube 122 by a rubber block 126. Front and rear braces 130 and 132 are bolted to the sides of the reticle gunsight housing so as to fix the beam splitter 108 in position within the upper or third chamber 34.

During daylight, it may not be necessary to utilize the chemical light stick 56, in which case the port 54 is unplugged by removing the screw-in plug 58 to let ambient light in. The ambient light is reflected by the white-gloss paint coating the inner walls of first chamber 30 so as to illuminate the cross hairs 16 aligned with the reticle hole or optical opening 68 in wall 64. If additional illumination is needed during daylight hours due to cloudiness, the chemical light stick 56 can be inserted and the port 54 plugged.

In that the beam splitter 108 aligns the image 13 of the target 14 (FIG. 1) and the cross hairs 16 (FIG. 4) when the barrel of the rifle or other firearm 12 is aimed at the target, the distance that the eye 18 of the shooter 19 must be placed from the gunsight is not restricted. The cross hairs 16 of the reticle will be in focus regardless of the distance between the eye 18 of the shooter 19 and the gunsight 10. Consequently, night vision goggles, gas masks and other head gear 20 do not interfere with effective use of the illuminated reticle gunsight 10 as is the case with conventional gunsights.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A sighting device for superimposing an image of a reticle on an image of a target comprising:

a first chamber having an opening therethrough for introducing a source of light to the first chamber;

a second chamber in communication with the first chamber through a wall having an optical opening therethrough aligned with the reticle, the second chamber having a collimating lens therein aligned with the optical opening for directing the image of the reticle into a prism which reflects the image of the reticle out of the second chamber said second chamber located above said first chamber; and a third chamber having front and rear optically open ends optically aligned with a beam splitter, the beam splitter being optically aligned with the image of the reticle reflected by the prism, said third chamber located above said second chamber, whereby when the image of the target is presented to the front end of the third chamber, the target image is superimposed upon the reticle image and viewable as such from the rear end of the third chamber when the sighting device is in alignment with the target.

2. The sighting device of claim 1, wherein the source of light is provided by a self-contained chemical illumination device.

3. The sighting device of claim 1, wherein the first chamber is accessed by a port which admits ambient light and through which a chemical illumination device is inserted into the first chamber, the port being plugged by a closure when the chemical illumination device is inserted.

4. The sighting device of claim 3, further including means for controlling the intensity of light passing to the collimating lens from the optical opening.

5. The sighting device of claim 4, wherein the means for controlling the intensity of light comprises an array of filters; wherein each of said filters has a different transmittance, and wherein the filters are selectively alignable with the optical opening.

6. A reticle gunsight useful for aiming a gun at a target, the reticle gunsight comprising:

a beam splitter having a first surface facing toward the target when the gun is aimed at the target and a second surface for receiving an image of a reticle to superimpose the image of the target on the image of the reticle when the gun is aimed at the target;

means for creating the reticle image comprising a wall with an optical opening therethrough aligned with the reticle;

means for selecting between ambient illumination as a light source for illuminating and transmitting the reticle image and a chemical illumination device as a light source for illuminating and transmitting the reticle image;

a dimming disk aligned with said optical opening and having a plurality of filters of different transmittance attached thereto, wherein each of said filters is selectively movable into alignment with said optical opening; and means for directing the reticle image onto the beam splitter.

7. In combination with a barrel of a gun, a reticle gunsight comprising:

means for mounting the reticle gunsight proximate the barrel of the gun and in alignment with the axis of the barrel;

a first chamber having a port therein for receiving a chemical light stick therethrough and a closure for closing the port wherein said chemical light stick is received in the first chamber, the first chamber being coated with a white gloss finish to reflect light therein wherein, if the light stick is not present in the first chamber and the closure is not in place, the first chamber may be illuminated by ambient light admitted through the port;

a second chamber separated from the first chamber by a wall, the second chamber being in communication with the first chamber through an optical opening in the wall, a reticle in alignment with the optical opening and in alignment with a collimated lens and prism wherein an image of the reticle is focussed by the collimating lens into the prism and reflected by the prism through a second opening in the second chamber;

a third chamber disposed above the second chamber and including therein a beam splitter aligned with the prism for receiving the image of the reticle, the third chamber having optically open first and second ends axially alignable with the barrel of the gun and with the beam splitter, whereby when the gun is aimed at a target an image of the target passes through the beam splitter with the image of the reticle being superimposed thereon for viewing by a person aiming the gun.

8. The combination of claim 7, further including a dimming disk disposed within the second chamber proximate the optical opening, the dimming disk having a plurality of filters thereon of different transmittance which are selectively alignable with the first opening upon rotating the dimming disk.

9. The gunsight of claim 8, wherein the dimming disk is rotated by a knob on the exterior of the gunsight which knob is connected to the dimming disk by a shaft.

10. A sighting device for superimposing an image of a reticle on an image of a target comprising:

a housing having a first opening therethrough for introducing a source of light into said housing;

a reticle located within said housing;

a wall located within said housing and having an optical opening therethrough aligned with said reticle;

a collimating lens located within said housing and aligned with said optical opening for directing the image of the reticle into a prism arranged so the image of the reticle passes through said prism;

an array of filters located within said housing; wherein each of said filters has a different transmittance and is selectively alignable with the optical opening; and a chamber located within said housing and having front and rear optically open ends optically aligned with a beam splitter, said beam splitter being optically aligned with said prism for receiving the image of the reticle, wherein the image of the target in front of said chamber is superimposed upon the reticle image and viewable from the rear end of said chamber when the sighting device is in alignment with the target.

11. The sighting device according to claim 10, further comprising a closure for sealing said first opening.

12. The sighting device according to claim 11, wherein said closure is an opaque closure.

* * * * *